Figure 1:
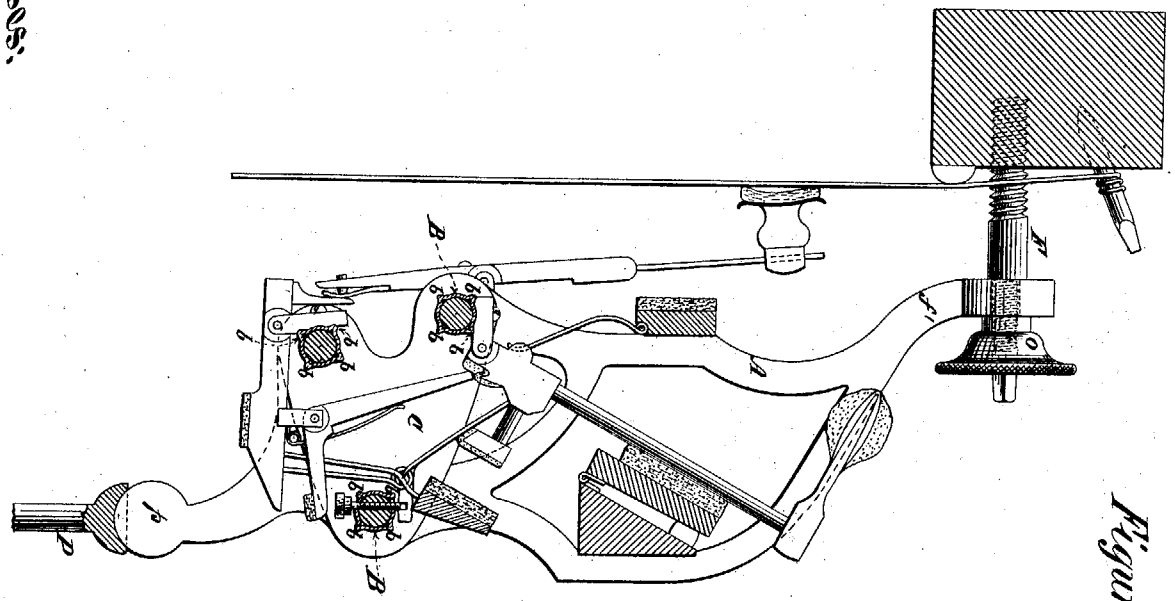

2 Sheets—Sheet 1.

C. F. T. STEINWAY,

Assignor, by mesne assignments, to himself and W. STEINWAY.

Piano-Action Frame.

No. 9,012. Reissued Dec. 30, 1879.

Witnesses:
Edw^d Payson
Geo. H. Miatt

Inventor:
C. F. Theodor Steinway
Per Edward E. Lumley
Atty

N. PETERS, PHOTO-LITHOGRAPHER, WASHINGTON, D. C.

2 Sheets—Sheet 2.

C. F. T. STEINWAY,

Assignor, by mesne assignments, to himself and W. STEINWAY.

Piano-Action Frame.

No. 9,012. Reissued Dec. 30, 1879.

Witnesses:
Edw^d Dayson
Geo. H. Miatt

Inventor:
C. F. Theodor Steinway
Per Edw. E. Lumby,
Atty.

N. PETERS, PHOTO-LITHOGRAPHER, WASHINGTON, D. C.

UNITED STATES PATENT OFFICE.

CHRISTIAN F. T. STEINWAY, OF NEW YORK, N. Y., ASSIGNOR, BY MESNE ASSIGNMENTS, TO HIMSELF AND WILLIAM STEINWAY.

IMPROVEMENT IN PIANO-ACTION FRAMES.

Specification forming part of Letters Patent No. 81,306, dated August 18, 1868; Reissue No. 7,950, dated November 13, 1877; Reissue No. 9,012, dated December 30, 1879; application filed October 21, 1879.

*To all whom it may concern:*

Be it known that I, CHRISTIAN F. THEODOR STEINWAY, of the city, county, and State of New York, have invented certain new and useful Improvements in Piano-Fortes, of which the following is a specification.

My improvements relate to the construction of the action-frame and its mode of application to the piano; and my invention consists in the introduction into the action-frame, at convenient distances apart, of metallic transverse pieces or standards, to which are secured the horizontal pieces of the frame, which serve as the supports for the various trains of mechanism composing the action. The horizontal pieces of the frame, by reason of being thus united, mutually support each other, and the frame as a whole is made to possess inherently the qualities of strength and stiffness in a marked degree.

Each of my standards is connected at its upper end with the wrest-plank, and at its lower end is supported in or upon the recessed head of a vertical screw. Thus the frame, as a whole, is provided with a horizontal axis of oscillation in front of the strings, and is hung to the wrest-plank at convenient distances.

As not only the ends of the frame, but also its interior portions, are connected with the wrest-plank, and the various trains of devices composing the action are provided with rigid supports, the proper relation of all the hammers and dampers to the strings is permanently preserved, even though there be any warping or springing of the wrest-plank.

I make my action-frame vertically adjustable by supporting the lower ends of the standards in or upon vertical screws, and I employ adjustable screw-bolts for connecting the upper ends of the standards with the wrest-plank, for the purpose of regulating the distance of the hammers and dampers from the strings.

As an additional means of strengthening the frame, I embody in it several horizontal pieces constructed of flanged metallic rods, or flanged metallic tubes filled with wood, and unite these flanged tubes by means of thin metallic plates or braces introduced transversely into the frame between the standards.

Figure 2:
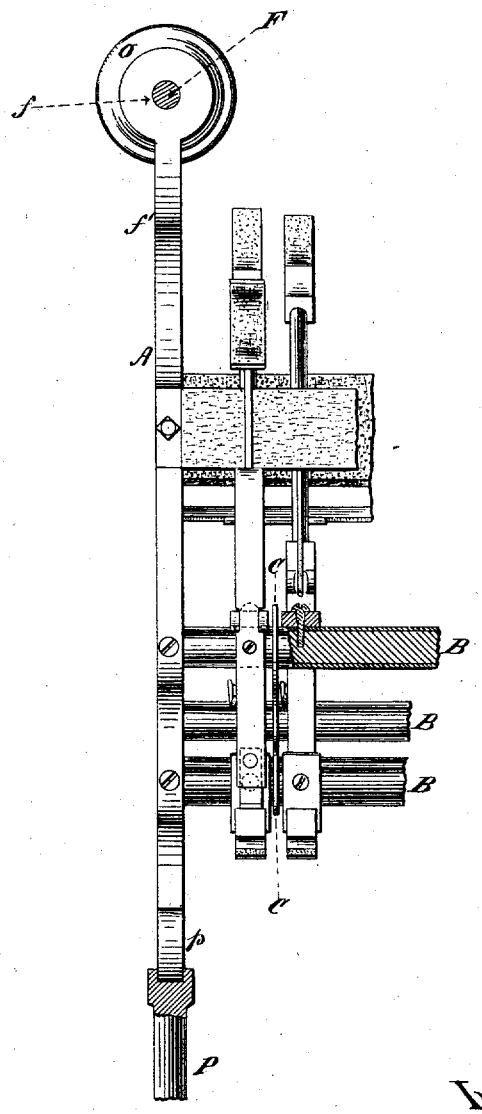
Figure 3:
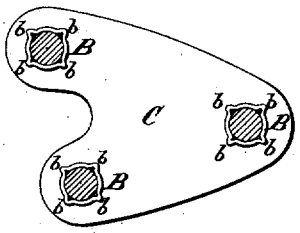

The accompanying drawings, illustrating my invention, are as follows:

Figure 1 is a transverse section of my action-frame, affording a side view of one of the standards, showing the mode of supporting the mechanism of the action upon the frame, and also the mode of supporting the frame and connecting it with the wrest-plank. Fig. 2 is a rear elevation, showing the edge of one of the standards, and portions of the horizontal pieces of the frame, and one of the vertical adjusting-screws. Fig. 3 is a face view of the thin metallic plate introduced into the frame at intervals between the standards.

The drawings represent one of the hangers or standards A of my action-frame, to which the horizontal pieces of the frame are fastened. Each standard is secured, by means of the horizontal screw F or any other suitable fastening, directly to the wrest-plank. The lower end, *p*, of each standard is made segmental or spherical, and fits into a cup or groove in the head of a screw, P, rising from the main frame of the piano-forte.

The stems of the screws F, which serve to secure the standards, and hence the action-frame, to the wrest-plank, pass loosely through the eyes *f* in the upward projections *f'* of the standards, respectively, and are clamped thereon by the jam-nuts *o*. The outer portions of the stems of the screws F are each made square, or of such shape as to permit their engagement by a wrench or key.

By releasing the jam-nuts from all the standards and turning their screws F, the action-frame can be adjusted closer to or farther from the wrest-plank, and the positions of the hammers and dampers with relation to the strings can thus be adjusted with the greatest nicety.

The horizontal pieces B of the frame, which, for convenience, I call "traverses," may be either made of solid metal rods or of metallic tubes filled with wood, and provided with flanges or ears *b*. When solid metal traverses are used, the holes for receiving the screws for fastening the action to them have to be bored and tapped, and screws have to be manufactured expressly for this purpose. I therefore, in practice, use, by preference, tubular traverses filled with wood, as shown in the drawings, because they are sufficiently stiff, and permit the use of common wood-screws for fastening the various parts of the action to them.

The flanges *b* on the traverses serve to retain the various parts of the action fastened to the traverses firmly and rigidly in position, and prevent them from getting displaced accidentally, and materially increase the stiffness and strength of the traverses.

The traverses, instead of being made with the flanges *b*, may be made with suitable grooves, or with ribs or indentations, so as to give a firm hold to the parts fastened thereto. These traverses, in addition to being fastened to the standards A, are secured in the plates C, which are introduced transversely into the frame at convenient distances between the standards A.

By my invention the chief causes of derangement inherently affecting the action, particularly of upright piano-fortes as heretofore constructed, are successfully removed.

Usually the several parts of the action are fastened to a wooden rail from two to three inches wide. Such rails are liable to contract or expand under the influence of atmospheric changes, and thus to throw the parts of the action out of their proper relative positions. The rails have been heretofore secured at their ends only to wooden cheeks or frame-pieces rigidly fastened at the sides of the instrument, thus creating a liability of derangement, not only in the several parts of the action, but in the position of the hammers and dampers with relation to the strings, which are fastened to the wrest-plank.

By my invention the action-frame, instead of deriving the elements of stiffness and strength principally from its connection with the sides or walls of the instrument, possesses these elements in itself, and by reason of its connection at convenient distances apart with the wrest-plank, and of the flexible character of its mode of application, it automatically accommodates itself to any warping or springing of the wrest-plank, and thus, under all circumstances, preserves the entire action in the proper relation to the strings.

I claim as my invention—

1. A piano-action frame composed of horizontal pieces united to transverse vertical standards, introduced into the frame at convenient distances apart and hung to the wrest-plank, substantially as described.

2. A piano-action frame composed of horizontal pieces united to transverse vertical standards or hangers, provided with a common horizontal axis of oscillation at the bottom, and secured at the top by means of horizontal adjusting-screws, for regulating the distance of the hammers and dampers from the strings, substantially as described.

3. A metallic standard for a piano-action frame, provided with bearings for the horizontal pieces of the frame, and with an upward projection for connection with the wrest-plank, substantially as shown, and for the purposes set forth.

4. A piano-action frame composed of horizontal pieces, which support the trains of mechanism composing the action, and which are secured to transverse standards arranged at convenient distances apart, and provided with upright projections, by which they are secured to the wrest-plank of the piano, substantially as and for the purposes set forth.

5. A piano-action frame, substantially such as described, having a horizontal axis of oscillation in front of the strings, and connected at convenient distances apart with the wrest-plank by means of adjusting-screws, substantially as and for the purposes set forth.

6. In combination with a piano-action frame substantially such as described, the vertical screws P, for effecting the vertical adjustment of the frame, substantially as described.

7. The flanged traverses B, constructed substantially as and for the purposes set forth.

8. The transverse plates C, provided with holes for the reception of the traverses B, substantially as and for the purposes set forth.

9. The combination, in a piano-action frame for upright pianos, of segments or spheres at the lower ends of the standards A with vertical adjusting-screws, in and upon the heads of which the standards are supported and may oscillate, substantially as and for the purpose described.

C. F. THEODOR STEINWAY.

Witnesses:

M. L. ADAMS,

EDWD. PAYSON.